(12) United States Patent
Sodemann et al.

(10) Patent No.: US 6,988,677 B2
(45) Date of Patent: Jan. 24, 2006

(54) WAND MOUNTED NOZZLE HOLDER

(75) Inventors: Wesley C. Sodemann, Dousman, WI (US); Robert L. Brandel, Elm Grove, WI (US); Richard A. Hosig, Lake Mills, WI (US); Carlo Sabattini, Padua (IT); Claudio Carpanese, Rovolon PD (IT)

(73) Assignee: Briggs & Stratton Power Products Group, LLC, Jefferson, WI (US)

( * ) Notice: Subject to any disclaimer, the term of this patent is extended or adjusted under 35 U.S.C. 154(b) by 0 days.

(21) Appl. No.: 10/241,561

(22) Filed: Sep. 11, 2002

(65) Prior Publication Data

US 2004/0046057 A1   Mar. 11, 2004

(51) Int. Cl.
*B05B 7/02* (2006.01)
(52) U.S. Cl. .................. 239/525; 239/390; 239/391
(58) Field of Classification Search ............... 239/525, 239/526, 527, 532, 600, 442, 289, 390, 391, 239/392, 397
See application file for complete search history.

(56) References Cited

U.S. PATENT DOCUMENTS

| | | | |
|---|---|---|---|
| 2,148,535 A | | 2/1939 | Cone |
| 3,825,187 A | * | 7/1974 | Tatge ......................... 239/312 |
| 4,541,568 A | | 9/1985 | Lichfield |
| 4,651,929 A | | 3/1987 | Kranzle |
| D303,139 S | | 8/1989 | Morgan |
| 5,118,080 A | | 6/1992 | Hartmann |
| 5,176,327 A | | 1/1993 | Petersen et al. |
| 5,303,869 A | | 4/1994 | Hudson, Jr. |
| 5,525,046 A | | 6/1996 | Hartmann |
| 5,732,438 A | * | 3/1998 | Tuvin et al. .................. 15/323 |
| D422,055 S | | 3/2000 | Stasny et al. |
| 6,062,486 A | * | 5/2000 | Hill ............................... 239/1 |
| 6,398,134 B1 | * | 6/2002 | Hickson et al. ............. 239/394 |
| 6,651,909 B1 | * | 11/2003 | Bugarin ...................... 239/390 |

\* cited by examiner

*Primary Examiner*—Thomas Denion
*Assistant Examiner*—Zelalem Eshete
(74) *Attorney, Agent, or Firm*—Michael Best & Friedrich LLP

(57) ABSTRACT

The invention recites an apparatus comprising a nozzle holder able to retain at least one nozzle and disposed on a pressure washer wand. The nozzle holder comprises a body including a bore extending therethrough. The bore is sized to engage the pressure washer wand. The nozzle holder further includes a boss interconnected with and having an aperture sized to receive at least one nozzle.

29 Claims, 4 Drawing Sheets

US 6,988,677 B2

WAND MOUNTED NOZZLE HOLDER

BACKGROUND OF THE INVENTION

The present invention relates to pressure washers, and particularly to pressure washers capable of using multiple nozzles.

Pressure washers provide a supply of high-pressure fluid, such as water alone or water mixed with a cleaning solution, for cleaning or moving debris. Pressure washers often include a cart that supports an engine that drives a high-pressure pump to supply the fluid to a wand. A trigger, usually disposed at the end of the wand, is depressed when the user wishes to discharge the fluid.

The opposite end of the wand includes an attachment portion for the attachment of one of a plurality of nozzles. Different nozzles are required for different jobs. For example, a wide angle nozzle may be suitable for cleaning loose debris off of a flat surface, while a more narrow nozzle may be required to remove paint or stains from a surface. To that end, pressure washers can typically use one of a multitude of nozzles at any given time to provide the user with a wide range of functionality.

Some pressure washers include nozzle holders on the cart. However, this can be inconvenient since the cleaning is often done some distance from the pressure washer cart. Users often carry the nozzles in their pocket rather than store them on the cart. This can cause damage to the nozzles makes it difficult to quickly locate the correct nozzle, and often results in a wet pocket, which is undesirable.

Pressure washers often use a supply of cold water for cleaning. The cold water often comes from a faucet or city water supply. The flow of cold water cools the wand, making it uncomfortable to grab in locations that are not insulated. Generally, the wand handle is the only insulated portion of the wand, thereby requiring the user to use a single hand to support the wand or alternatively, to use the second hand on the non-insulated portion of the wand.

SUMMARY OF THE PREFERRED EMBODIMENT

The apparatus of the present invention provides a nozzle holder able to retain at least one nozzle and disposed on a pressure washer wand. The nozzle holder includes a body having a bore extending therethrough. The bore is sized to engage the pressure washer wand. The nozzle holder further includes a boss interconnected with and having an aperture sized to receive at least one nozzle.

In preferred constructions, a plurality of bosses define a plurality of apertures, thereby facilitating the storage of a plurality of nozzles. In addition, the nozzle holder is integrally formed with the pressure washer wand from a thermally insulative material. The nozzle holder also includes a plurality of raised portions to improve the user's grip on the wand.

In another embodiment, the apparatus provides a pressure washer wand adapted for use with one of a plurality of nozzles. The wand includes a handle portion, a tube portion connected to the handle portion, and a nozzle connector portion connected to the tube portion. The nozzle connector portion is engagable with one of the plurality of nozzles. The wand further includes a nozzle holder including a body having a bore extending therethrough. The bore is sized to engage the tube portion. The nozzle holder defines an aperture sized to receive one of the plurality of nozzles.

The invention also provides a method of manufacturing a pressure washer wand. The method comprises the acts of providing a handle portion, a tube portion, and a mold having at least one surface that corresponds to the nozzle holder. The method further includes the acts of positioning a portion of the tube portion in the mold, injecting a material into the mold, and removing the tube portion from the mold. The method also includes the act of allowing the injected material to set.

BRIEF DESCRIPTION OF THE DRAWINGS

The detailed description particularly refers to the accompanying figures in which.

DETAILED DESCRIPTION OF THE DRAWINGS

Figure 3:
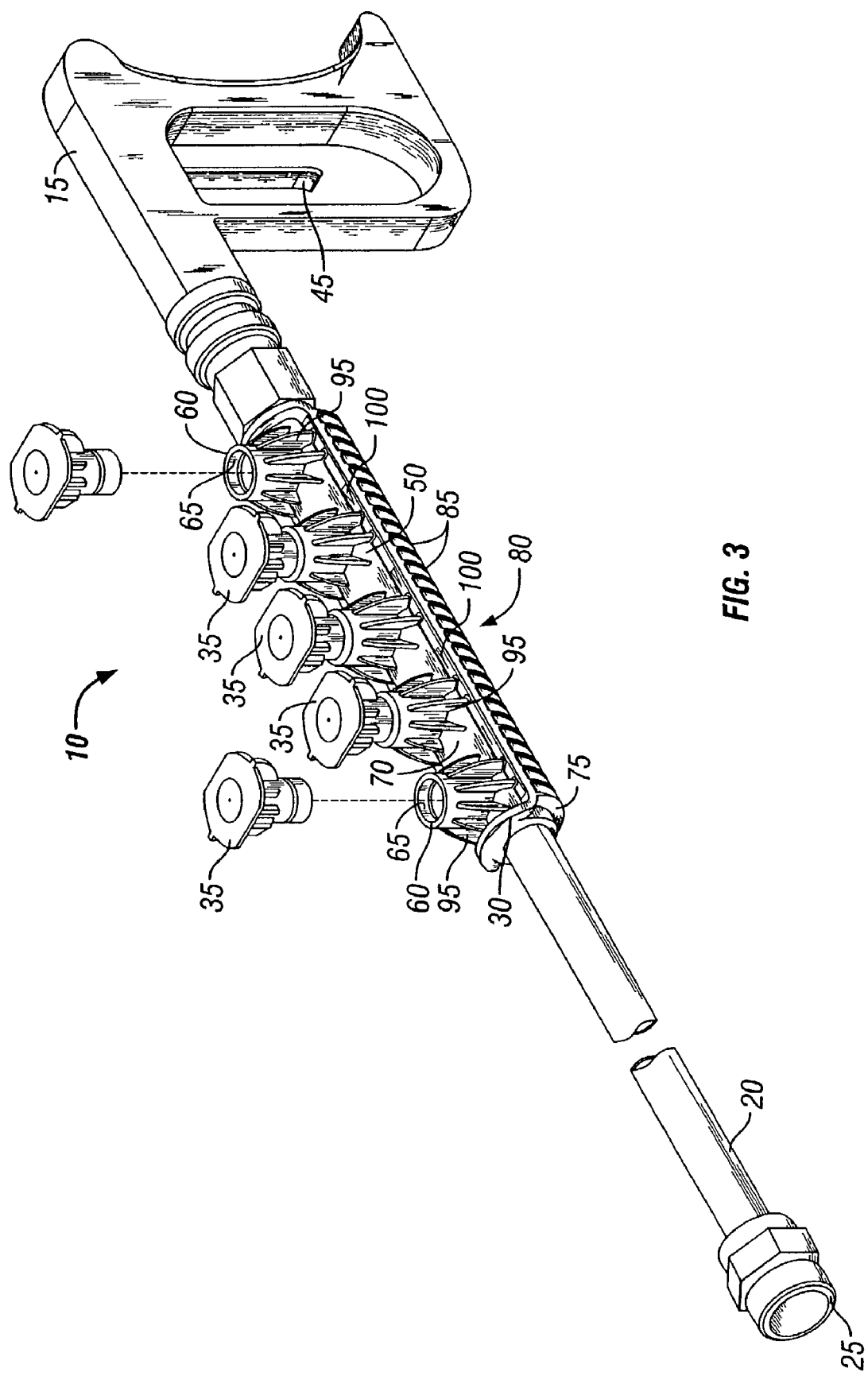
FIG. 3 is a partially exploded perspective view of the nozzle holder of FIG. 1, mounted to a pressure washer wand and including a plurality of stored nozzles.

With reference to FIG. 3, a pressure washer wand 10 includes a wand handle 15, a tube 20, and a nozzle connector 25. In addition, the pressure washer wand 10 includes a nozzle holder 30 attached to the tube 20 and a plurality of nozzles 35 stored in the nozzle holder 30.

The wand handle 15 is generally molded from plastic or another thermally insulative material. The handle 15 includes a fitting that connects the handle 15 to a high-pressure hose. The hose transports high-pressure fluid from a pressure washer or other high-pressure supply (e.g., storage tank, high-pressure pump, high-head gravity feed) to the wand 10.

The handle 15 also includes a trigger 45 that controls a valve (not shown). The valve, when actuated, ports high-pressure water from the high-pressure source to the remainder of the wand 15. When not actuated, the valve prevents flow beyond the wand handle 15.

When the trigger 45 is actuated, the high-pressure flow exits the handle 15 and flows into the tube portion 20 of the wand 15. The tube portion 20 is simply a tube that separates the handle 15 from the nozzle connector 25. Due to the high-pressure within the tube 20, preferred constructions employ circular steel tubes with other shapes and materials being possible.

The end of the tube portion 20 away from the handle 15 supports the nozzle connector 25 such as a fitting that allows for the connection of one of a plurality of nozzles 35. In preferred constructions, the fitting is a quick-connect fitting or a threaded region that allows for the quick and tool-less connection of the nozzle 35 to the wand 10.

The nozzle 35 directs the high-pressure flow in a fan-shaped pattern having a diffusion angle. Different nozzles 35 produce different diffusion angles. The angles vary from 0°, used to produce a jet or lance, to 40° or more, used to produce a large spread useful for cleaning large surfaces.

Figure 1:
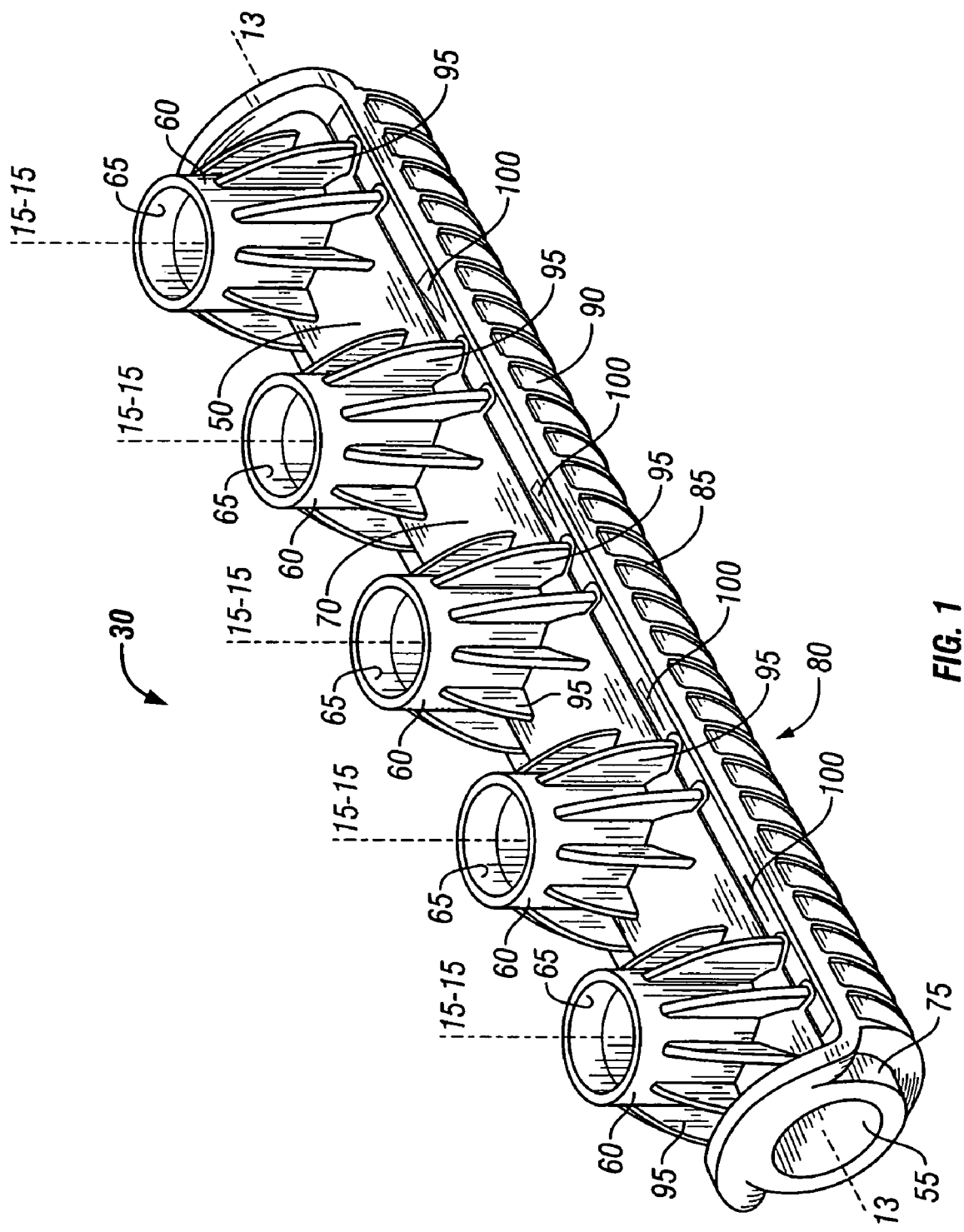
FIG. 1 is a perspective view of a nozzle holder.
Figure 2:
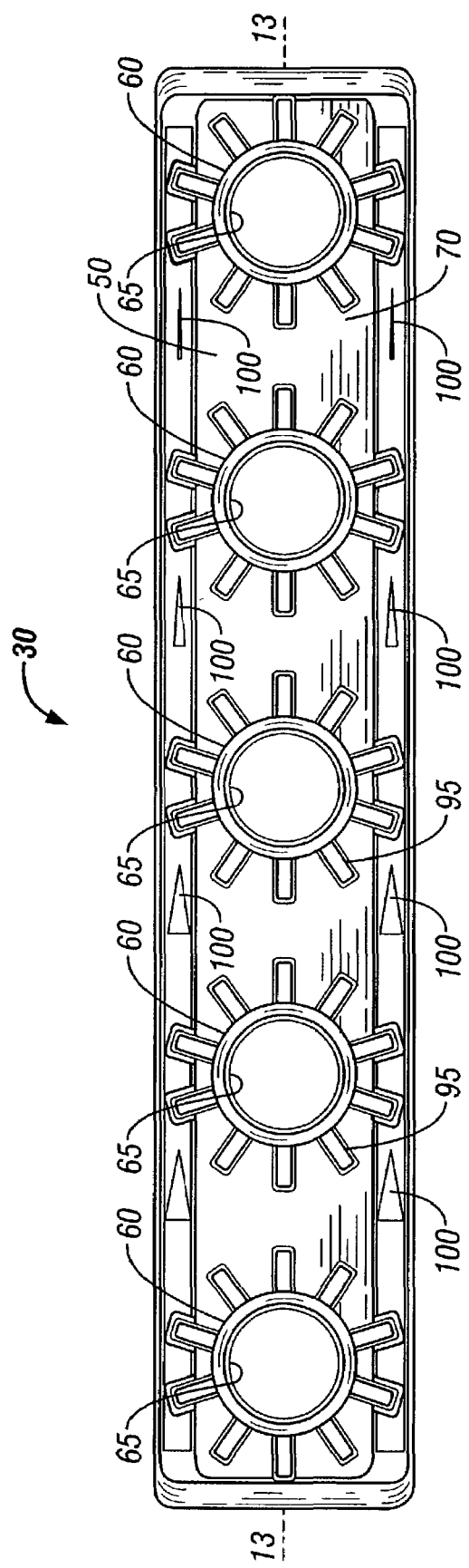
FIG. 2 is a top view of the nozzle holder of FIG. 1.
Figure 4:
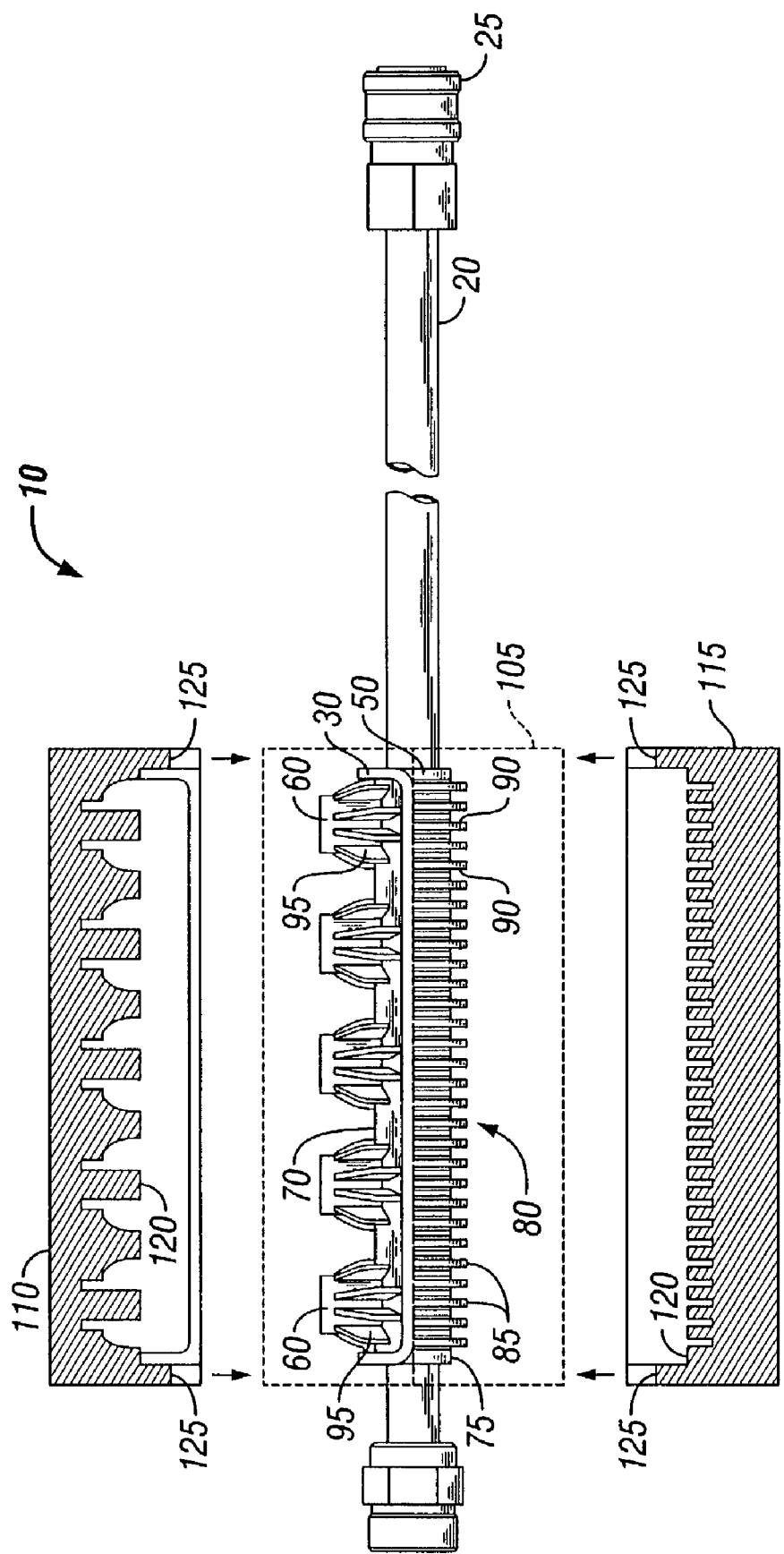
FIG. 4 is a partially sectioned side view of the assembly of FIG. 3 including a pair of mold halves.

The nozzle holder 30, illustrated best in FIGS. 1 and 2, includes a body 50, a central bore 55, and a plurality of bosses 60 each containing an aperture 65 therein. FIGS. 3 and 4 illustrate the nozzle holder 30 in position on the tube portion 20 of the wand 10. As shown, the nozzle holder 30 position allows the user to grasp the wand 10 with both hands. One hand holds and operates the handle portion 15, while the second hand grabs the nozzle holder 30 disposed on the tube portion 20 of the wand 10.

Referring to FIG. 1, the body 50 is generally formed as an elongated tube having a top surface 70 and a bottom surface 75. The bore 55 extends through the body 50 along a longitudinal axis 13—13 and is sized and shaped to engage the tube portion 20 of the wand 10. The bottom surface 75 of the body 50 includes a grip 80 defined by a plurality of raised portions 85. In the construction illustrated in FIGS. 1, 3, and 4, the raised portions 85 are flat annular ring members 90 having centers disposed substantially on the longitudinal axis 13—13 of the body 50. The ring members 90 are generally equally spaced from one another, and they provide an improved surface for the user to grip. Other constructions use other shapes for the raised portions 85. For example, a plurality of radial spikes equally spaced or randomly spaced from one another also provides an improved grip. In addition to improving the grip, the raised portions 85 reduce the surface area contacted by the user, thereby reducing the heat transfer between the user to the wand 10. The reduced heat transfer allows the user to support the wand 10 for a longer duration without the cold (or heat if hot fluid is used) adversely effecting the user's grip or causing discomfort.

To further reduce the heat transfer and improve the comfort of the user, the body 50 is formed from a thermally insulative material (e.g., plastic, rubber, ceramic, or certain composites). Preferred constructions employ plastic for its ease of manufacture, low cost, and good insulative properties. In still other constructions, metal or non-insulative materials may be used if desired.

The bosses 60, best illustrated in FIG. 1, extend from the top surface 70 of the body 50 along substantially parallel axes 15—15 that are also coplanar. Each boss 60 includes a plurality of radial rib members 95 that provide additional strength and support to the boss 60. The apertures 65 within each boss 60 are sized and shaped to receive a nozzle 35 for storage. Alternatively, a grommet (not shown) inserts into the aperture 65 to allow the nozzle holder 30 to accommodate virtually any size and shape of nozzle 35.

Many different aperture shapes will work with the present invention (e.g., straight bore, tapered bore, curved bore, or stepped bore). The shape of the aperture 65 is chosen to accommodate the shape or design of the nozzle 35 to be stored therein. In constructions employing grommets, the grommets may also employ various bore designs. In addition, the grommet may be made of a soft or pliable material that is better able to grab the nozzle 35 and firmly retain it within the nozzle holder 30.

Turning to FIG. 2, the top view of the nozzle holder 30 reveals indicators 100 on the body 50 adjacent the bosses 60. Each indicator 100 is triangular in shape and represents the shape of the nozzle discharge (i.e., the nozzle diffusion angle) for the nozzle 35 stored in the aperture 65. The indicators 100 are formed as part of the body 50 during manufacture and represent standard nozzle sizes. Alternatively, stickers, paint, or other post manufacturing indicators 100 may be applied to the body 50. In addition, text indicators (e.g., 0°, 10°, 25°, 45°) may be used to indicate the nozzle size, diffusion angle, or any other property that can be used to identify the nozzles.

Referring again to FIG. 3, the nozzle holder 30 is shown in its installed position on the wand 10. The largest and smallest angle nozzles 35 are shown removed from their storage positions. While the construction illustrated in FIGS. 1–4 includes storage positions for five nozzles 35, it should be evident that fewer or more storage positions could be employed. The only limits to the length of the nozzle holder 30 being the length of the tube portion 20 of the wand 10, and the weight of the nozzle holder 30 with stored nozzles 35.

In another construction (not shown), the aperture axes are radial with respect to the nozzle holder body. The bosses radiate from the body in a radial direction like spokes. A grip portion attaches to the radial bosses and provides a surface for the user to grasp as in previous constructions. As one skilled in the art will realize, there are several patterns and arrangements available for the nozzle holder and therefore, the invention should not be limited to those few described herein.

In preferred constructions, the complete body 50, as illustrated in FIGS. 3 and 4 is formed directly onto the tubular portion 20 of the wand 10 in a single operation. Directly forming the body 50 onto the wand 10 firmly fixes the position of the body 50 and improves the strength of the attachment between the wand 10 and the nozzle holder 30.

As shown in FIG. 4, a portion of the tube 20 of the wand 10 is placed in a mold 105. Generally, the mold 105 includes two halves 110, 115 that define a surface 120 that corresponds to the nozzle holder 30. The two halves 110, 115 further define holes 125 at either end. The holes are sized to allow the tube 20 of the wand 10 to extend out both ends of the mold 105. The two halves 110, 115 are closed and a plastic or other molten or pumpable material (e.g., rubber particles, plastic particles, and ceramic) is injected into the mold 105. The mold 105 can be temperature controlled to aid in the setting process or to allow the mold 105 to heat the material therein. When the material is sufficiently rigid, the mold halves 110, 115 are separated and the completed nozzle holder 30 formed on the tube 20 is removed.

By molding the nozzle holder 30 directly onto the tube 20, the manufacturing process is able to provide a nozzle holder that engages any shape tube. For example, a holder can be directly molded to a tube having a hexagonal cross-section without requiring the machining of a hexagonal bore.

In many constructions, the apertures 65 within the bosses 60 are formed in the molding step with the body 50. However, other constructions use subsequent manufacturing steps to form the apertures 65.

Alternatively, the body 50 is molded as a solid piece and subsequent manufacturing operations machine or otherwise form the central bore 55 and the apertures 65 in the molded body 50. The completed nozzle holder 30 then slides onto the tube portion 20 of the wand 10 and the wand handle 15 and fittings 25 are attached to complete the wand 10.

Although the invention has been described in detail with reference to certain preferred embodiments, variations and modifications exist within the scope and spirit of the invention as described and defined in the following claims.

What is claimed is:

1. A nozzle holder able to retain at least one nozzle and disposed on a pressure washer wand, the nozzle holder comprising:
   a body including a bore extending therethrough, the bore engaged with the pressure washer wand;
   a boss interconnected with and having an aperture sized to receive at least one nozzle, the boss being substantially fixed relative to the bore in all operating positions.

2. The nozzle holder of claim 1, wherein the pressure washer wand further includes a handle portion and a tube portion, and the nozzle holder body is integrally formed around a portion of the tube portion.

3. The nozzle holder of claim 2, wherein the nozzle holder is positioned on the tube portion to allow a user to support the wand for use with one hand on the handle portion and the other hand on the nozzle holder body.

4. The nozzle holder of claim 1, further comprising a plurality of bosses, each boss including an aperture therein and each aperture sized to receive a nozzle.

5. The nozzle holder of claim 4, wherein each aperture includes a central axis, and the axes of the apertures are substantially parallel to one another and reside substantially on a single plane.

6. The nozzle holder of claim 1, wherein the body and the boss are integrally formed as a single piece.

7. A nozzle holder able to retain at least one nozzle and disposed on a pressure washer wand, the nozzle holder comprising:
   a body including a bore extending therethrough, the bore sized to engage the pressure washer wand;
   a boss interconnected with and having an aperture sized to receive at least one nozzle, wherein the body includes a top portion and a bottom portion, and wherein the bottom portion further comprises a plurality of raised portions and a plurality of lowered portions.

8. The nozzle holder of claim 7, wherein the raised portions are parallel ribs spaced substantially equally apart, each rib at least partially surrounding the body.

9. The nozzle holder of claim 1, wherein the body is made from a thermally insulative material.

10. The nozzle holder of claim 1, wherein the body includes a grip for holding the body.

11. A pressure washer wand adapted for use with one of a plurality of nozzles, the wand comprising:
    a handle portion;
    a tube portion connected to the handle portion;
    a nozzle connector portion connected to the tube portion, the nozzle connector portion engagable with one of the plurality of nozzles; and
    a nozzle holder including a body having a bore extending therethrough, the bore engaged with the tube portion, the nozzle holder defining an aperture sized to receive one of the plurality of nozzles, such that the nozzle is positioned between the handle portion and the nozzle connector portion.

12. The pressure washer wand of claim 11, wherein the nozzle holder body is integrally formed around a portion of the tube portion.

13. The pressure washer wand of claim 12, wherein the nozzle holder is positioned on the tube portion to allow a user to support the wand for use with one hand on the handle portion and the other hand on the nozzle holder body.

14. The pressure washer wand of claim 11, further comprising a plurality of bosses, each boss including an aperture therein and each aperture sized to receive one of the plurality of nozzles.

15. The pressure washer wand of claim 14, wherein the body and the bosses are integrally formed as a single piece.

16. A pressure washer wand adapted for use with one of a plurality of nozzles, the wand comprising:
    a handle portion;
    a tube portion connected to the handle portion;
    a nozzle connector portion connected to the tube portion, the nozzle connector portion engagable with one of the plurality of nozzles; and
    a nozzle holder including a body having a bore extending therethrough, the bore sized to engage the tube portion, the nozzle holder defining an aperture sized to receive one of the plurality of nozzles, wherein the body includes a top portion and a bottom portion, and wherein the bottom portion further comprises a plurality of raised portions and a plurality of lowered portions.

17. The pressure washer wand of claim 11, wherein each aperture includes a central axis, and the axes of the apertures are substantially parallel to one another and reside substantially on a single plane.

18. The pressure washer wand of claim 11, wherein the body is made from a thermally insulative material.

19. The pressure washer wand of claim 11, wherein each nozzle defines a characteristic and wherein the nozzle holder further comprises a label indicating the value of the characteristic of the nozzle to be stored in each aperture.

20. The nozzle holder of claim 11, wherein the body includes a grip for holding the body.

21. A pressure washer wand comprising:
    a tubular portion having a first end and a second end;
    a handle portion disposed adjacent the first end; and
    a single piece nozzle holder disposed around at least a portion of the tubular portion, the nozzle holder defining at least one aperture sized to receive a nozzle.

22. The pressure washer wand of claim 21, wherein the nozzle holder defines a bore therethrough, and at least a portion of the tubular portion is received in the bore.

23. The pressure washer wand of claim 21, wherein the nozzle holder is integrally formed around at least a portion of the tubular portion.

24. The pressure washer wand of claim 21, wherein the nozzle holder is positioned nearer to the first end than to the second end.

25. The pressure washer wand of claim 21, further comprising a plurality of apertures, each aperture sized to receive a nozzle.

26. The pressure washer wand of claim 25, further comprising a plurality of bosses integrally formed as part of the nozzle holder, each of the plurality of apertures disposed in one of the plurality of bosses.

27. The pressure washer wand of claim 25, wherein the nozzle holder is formed from a thermally insulative material.

28. A pressure washer wand comprising:
    a tubular portion having a first end and a second end;
    a handle portion disposed adjacent the first end; and
    a single piece nozzle holder disposed around at least a portion of the tubular portion, the nozzle holder defining at least one aperture sized to receive a nozzle, wherein the nozzle holder includes a bottom portion, and wherein the bottom portion further comprises a plurality of raised portions and a plurality of lowered portions.

29. The pressure washer wand of claim 21, further comprising a nozzle connector portion arranged to receive a nozzle, the nozzle connector portion disposed adjacent the second end of the tubular portion.

* * * * *